K. IKEDA & S. SUZUKI.
PROCESS OF SEPARATING GLUTAMIC ACID AND OTHER PRODUCTS OF HYDROLYSIS OF ALBUMINOUS SUBSTANCES FROM ONE ANOTHER BY ELECTROLYSIS.
APPLICATION FILED MAY 2, 1911.
1,015,891. Patented Jan. 30, 1912.
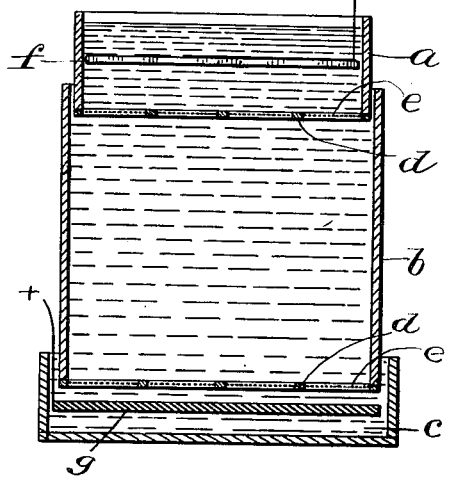
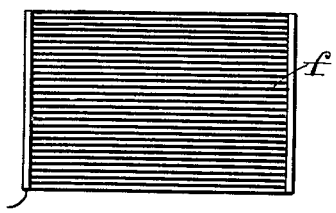
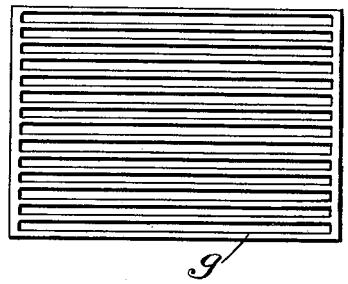
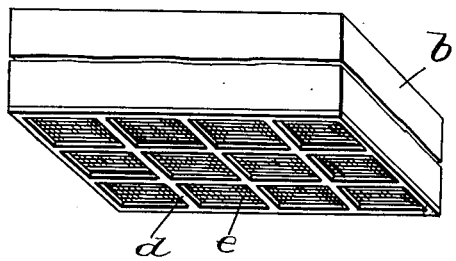
Witnesses
H C Hunsberger
C. J. Dulin
Inventors
Kikunae Ikeda,
and Saburosuke Suzuki.
By B. Singer
Attorney

UNITED STATES PATENT OFFICE.

KIKUNAE IKEDA AND SABUROSUKE SUZUKI, OF TOKYO, JAPAN.

PROCESS OF SEPARATING GLUTAMIC ACID AND OTHER PRODUCTS OF HYDROLYSIS OF ALBUMINOUS SUBSTANCES FROM ONE ANOTHER BY ELECTROLYSIS.

1,015,891. Specification of Letters Patent. Patented Jan. 30, 1912.

Application filed May 2, 1911. Serial No. 624,655.

*To all whom it may concern:*

Be it known that we, KIKUNAE IKEDA and SABUROSUKE SUZUKI, subjects of the Emperor of Japan, residing at 13 Akebonocho Hongo-ku and 14 Atagocho Nichome, Shiba-ku, respectively, Tokyo, in the Empire of Japan, have invented new and useful improvements in processes of separating glutamic acid and other products of hydrolysis of albuminous substances from one another by electrolysis, of which the following is a specification.

Our invention relates to a process of separating the products of hydrolysis of albuminous substances by electrolysis. One of the products, glutamic acid, has now found application on a large scale in the manufacture of flavoring, according to the present invention, and the other products will also doubtless attain commercial importance in near future. Methods for the separation of these substances already exist which are very serviceable in scientific investigations, but none of them are available for industrial purposes.

The process constituting the present invention is not only a rational one for scientific purposes, but is also applicable to manufacture on a large scale, and is based upon the following considerations. The products of hydrolysis of albuminous substances may be divided into three classes of compounds, *i. e.* compounds of decidedly basic character, those of pronounced acid nature and the neutral and amphoteric compounds whose basic and acidic properties are very nearly balanced. To the first class belong ammonia, arginin, histidin, lysin and some other bases; to the second belong glutamic acid and aspartic acid in which as monoamino-dicarboxylic acids, acid nature preponderates greatly over the basic; while to the third class belong monoamino-monocarboxylic acids such as glycin, alanin, valin, leucin, etc., which are very weak both as acid and base. When a protein substance is completely hydrolyzed, there is in general an excess of basic compounds over those of decidedly acid nature. Hence to make the solution perfectly neutral a part of the bases must be removed or a certain quantity of an acid must be added. When this is done a solution is obtained which turns both red and blue litmus paper violet on account of the amphoteric nature of several components. In such a mixture the bases are present mostly in the state of cations, the decidedly acidic compounds in the state of anions, while those weak amphoteric compounds exist mostly in the state of neutral molecules. If an electric current is passed through the solution bases must be set free at the cathode together with gaseous hydrogen; the compounds of decidedly acid nature will accumulate at the anode as the salts of the anode metal, provided the latter is of sufficiently strong electropositive nature; while the weak amphoteric compounds will not partake in the electrolysis in any marked degree. It must therefore be possible to separate the compounds of the three classes from one another when the electrolysis is carried out under appropriate conditions. The isolation of each compound is then much facilitated. For example, glutamic acid can be obtained pure from the anodic liquid quite easily by processes which vary somewhat according to the nature of the anodic metal employed.

The process constituting the present invention is carried out as follows: The albuminous substance is best hydrolyzed by heating it with dilute sulfuric acid, because the acid can be most readily removed in the form of calcium or barium sulfate after the action is over. The solution, from which the sulfuric acid as well as calcium or barium sulfate has been removed by proper means, is freed from ammonia by boiling. It should then be very nearly neutral, and if not it is neutralized by careful addition of an acid, for instance hydrochloric acid. The solution is placed in an electrolytic cell, which consists of three compartments separated from one another by two diaphragms. The two outer compartments, in each of which the electrode is placed, are made much smaller than the middle compartment. The cathode is made of iron, while the anode is made of zinc, aluminium, iron or any other metal readily soluble in acid. When electrolysis has been carried out for a sufficient length of time the bases are found accumulated in the cathodic compartment, and glutamic acid, together with aspartic acid, etc., are collected in the anodic space as salts of the anode metal which is used. The greater part of the weak amphoteric amino-acids remain in the middle compartment. When the electrolysis is practically completed the solution in each compartment is separately worked up. The solution in the middle compartment gives, after concentration, crystals of tyrosin and leucin, and from the mother liquor glycocol, alanin, etc., can be obtained. The liquid in the cathodic space may be worked up for arginin, histidin, etc., by proper methods, for example, by crystallization, after neutralization with picric acid. In order to isolate glutamic acid from the anodic liquid, the metal is removed as sulfate, hydroxid or carbonate, by adding hydrogen sulfid, ammonia or sodium carbonate. When the metal is removed as sulfid the liquid becomes rather strongly acid on account of the presence of other acids, and glutamic acid is held in solution in spite of its slight solubility in water. By careful addition of alkali, glutamic acid is precipitated in the free state; or the liquid may be saturated with hydrochloric acid and set aside for several days when glutamic acid crystallizes out as hydrochlorid. The latter method is also to be used when the metal has been removed as carbonate or hydroxid. The crystals of glutamic acid hydrochlorid which are generally mixed with other salts are dissolved in water, and as much soda is added as is necessary to neutralize free hydrochloric acid. Glutamic acid is then precipitated as fine crystalline powder and can be readily purified by recrystallization.

The electrolytical separation of the products of the hydrolysis of the albuminous substances, according to the present invention, may be carried out with the aid of the apparatus shown in the accompanying drawings, in which:—

Figure 1 is a vertical section of the apparatus, showing the three compartments hereinafter referred to; Fig. 2 is a plan view of the cathode used in the practice of our invention; Fig. 3 is a plan view of the anode; and Fig. 4 is a perspective view representing the structure of the middle and cathode compartments.

Example: Glycinin obtained from the soya bean is hydrolyzed by digesting it with sulfuric acid of 25 per cent. strength at a temperature of 100–120° centigrade, during 6–10 hours, and the resulting liquid is filtered from the black humus like substance. Slaked lime is added in slight excess to the liquid and the calcium sulfate produced is removed by filtration. Any sulfate in the solution is eliminated by the cautious addition of baryta water. On passing carbon dioxid through the solution and allowing to stand for some time, all calcium is precipitated as carbonate. The liquid is again filtered and is then evaporated under reduced pressure so as to drive off free ammonia. In this way a very nearly neutral solution is obtained. The liquid is shaken with a little toluene to make it antiseptic and with this the electrolytic cell is filled. It has been found preferable to form the electrolytic cell into three compartments separable from one another and arranged one above the other, as is illustrated in the accompanying drawings. Such arrangement is illustrated particularly in Fig. 1, wherein $a$ represents the upper or cathodic compartment, $b$ the middle compartment, and $c$ the lower or anodic compartment. The bottoms of the two upper compartments consist of a framework $d$, over which strong canvas $e$ is stretched, said canvas having been previously impregnated with gelatin which is made insoluble by treatment with formaldehyde, and constituting a diaphragm, (see particularly Fig. 4). Such a diaphragm does not hinder the interdiffusion of the components in solution, and easily allows the passage of the electric current, but otherwise it is water-tight. It is necessary that the diaphragms be supported by the gratings or framework $d$. The gratings and the outer framework of the compartments are preferably constructed of wood impregnated with paraffin or coal-tar. In the uppermost compartment is placed a cathode $f$, which is constructed of iron wire gauze or of a grating formed of iron rods, the latter construction being shown particularly in Fig. 2. In the lowermost compartment is placed the anode $g$, constructed of zinc, and also in the form of a grating, as will be evident from Fig. 3. The potential difference between electrodes is kept at 4–6 volts. The resistance of the cell varies of course according to its dimensions and the concentration of the solution, and increases considerably as the electrolysis progresses. The current density must not be too large because then glutamic acid undergoes a peculiar change, the nature of which is not yet clearly understood. It is best to maintain the current density below one ampere per square decimeter, and in actual practice it is much less. In about 48 hours the electrolysis is practically completed. The three compartments are separated from one another and their contents are worked up in any convenient manner. In order to obtain glutamic acid from the anodic solution hydrogen sulfid is passed through it, if necessary with addition of calcium carbonate so as to keep down the acidity. The liquid is filtered from zinc sulfid and concentrated by evaporation. It is then saturated with hydrochloric acid and allowed to stand for several days when hydrochlorid of glutamic acid crystallizes out almost completely. The crystals of glutamic acid hydrochlorid, which may be mixed with other salts, are dissolved in water, and the quantity of soda requisite for the neutralization of the hydrochloric acid is added. Glutamic acid is then precipitated as a fine crystalline powder and can be readily purified by recrystallization.

We claim:—

1. The process of separating the products of hydrolysis of albuminous substances into three groups of compounds, which consists in preparing an aqueous solution of the said hydrolytic products, subjecting the said solution of hydrolytic products to electrolysis to separate it into groups collecting at the anode, cathode, and intermediate space, and finally collecting the three groups of compounds formed, the first group consisting of compounds of decidedly basic character, the second group consisting of compounds of pronounced acid character, and the third group consisting of neutral compounds having very weak basic and acid character.

2. The process of separating the products of hydrolysis of albuminous substances into three groups of compounds, which consists in preparing an aqueous solution of the said hydrolytic products, subjecting the said solution of hydrolytic products to electrolysis in a cell divided into three compartments and containing a corrodible anode to separate the solution into groups collecting at the anode, cathode, and intermediate space, and finally collecting the three groups of compounds formed, the first group consisting of compounds of decidedly basic character, the second group consisting of compounds of pronounced acid character and salts of the anode metal, and the third group consisting of neutral compounds having very weak basic and acid character.

3. The process of obtaining glutanic acid from the products of hydrolysis of albuminous substances, which consists in preparing an aqueous solution of the said hydrolytic products, subjecting the said solution of hydrolytic products to electrolysis in a cell divided into three compartments and containing a corrodible anode to separate the solution into groups collecting at the anode, cathode, and intermediate space, collecting the three groups of compounds formed, the first group consisting of compounds of decidedly basic character, the second group consisting of compounds of pronounced acid character and salts of the anode metal, and the third group consisting of neutral compounds having very weak basic and acid character, and finally separating the glutamic acid from the group of compounds of pronounced acid character.

4. The process of obtaining glutamic acid, which consists in hydrolyzing an albuminous substance by heating said albuminous substance with sulfuric acid, filtering the liquid, removing the sulfuric acid and sulfates from the liquid, subjecting the liquid to electrolysis in a cell divided into three compartments and containing a corrodible anode to separate the liquid into groups collecting at the anode, cathode, and intermediate space, collecting the three groups of compounds formed, one of the liquid groups consisting of compounds of pronounced acid character and salts of the anode metal and containing the anodic metal salt of glutamic acid, and finally separating the glutamic acid from said group.

5. The process of obtaining glutamic acid, which consists in hydrolyzing an albuminous substance by heating said albuminous substance with sulfuric acid, filtering the liquid, removing the sulfuric acid and sulfates from the liquid, subjecting the liquid to electrolysis in a cell divided into three compartments and containing a corrodible anode to separate the liquid into groups collecting at the anode, cathode, and intermediate space, collecting the three groups of compounds formed, one of the liquid groups consisting of compounds of pronounced acid character and salts of the anode metal and containing the anodic metal salts of glutamic acid, passing hydrogen sulfid into the liquid, filtering and concentrating the liquid, adding hydrochloric acid thereto, allowing to stand for several days whereby hydrochlorid of glutamic acid is obtained, and finally separating the glutamic acid from said hydrochlorid.

In testimony whereof we affix our signatures in presence of two witnesses.

KIKUNAE IKEDA.
SABUROSUKE SUZUKI.

Witnesses:
H. F. HAWLEY,
M. NAWLON.